Patented Oct. 23, 1934

1,977,642

UNITED STATES PATENT OFFICE 1,977,642

COMPOSITIONS OF MATTER

William Henry Moss, London, England, assignor to Celanese Corporation of America, a corporation of Delaware No Drawing. Application July 14, 1931, Serial No. 550,808. In Great Britain August 28, 1930

8 Claims. (Cl. 134—79)

This invention relates to the production of compositions of matter and more particularly to coating or impregnating compositions which yield flexible films on evaporation of the solvent.

The use of organic derivatives of cellulose in the production of compositions for coating and impregnating compositions is well known. The film left by these compositions is however usually fairly rigid and if subjected to any considerable bending or to repeated flexing is liable to crack, or to flake from the surface to which it is attached. The incorporation of relatively low proportions of plasticisers in the films improves to some extent their suppleness but the films even then do not approach the flexibility desired for many purposes. I have found that in order to attain a very high degree of flexibility it is necessary to incorporate high proportions of plasticiser, for example proportions of over 100% and especially proportions of 150 to 200 to 250% based on the cellulose derivative in the films. However in many cases plasticisers are liable to bloom out when employed in large proportions owing to lack of compatibility with the other constituents of the film. Other plasticisers cause the film to remain sticky on evaporation of the solvent. Still others are slightly volatile and although the film may be supple when first made, yet in the course of time it becomes brittle once more. The difficulties are greatly enhanced if the film is likely to be exposed to temperatures above the normal. Plasticisers have therefore been sought which combine qualities of a high degree of compatibility with other ingredients of organic cellulose derivative lacquers or coating compositions, with lack of volatility, and will permit the production of surfaces which are not sticky, and which preferably retain these qualities when the surfaces in which they are present are exposed to temperatures up to for example 100° C.

It has now been found that plasticisers possessing these qualities include plasticisers of the aromatic sulphonamide and particularly the N-alkyl aromatic sulphonamide class, for example xylene monomethyl sulphonamide, and tartrate plasticisers, for example dibutyl tartrate and amyl tartrate, (i. e. di-isoamyl tartrate). Compositions of matter containing organic derivatives of cellulose and more than 100% of these plasticisers based on the cellulose derivative present, and preferably between 150 and 250%, are eminently adapted for the production of flexible materials or for coating flexible materials e. g. in coating wires, for coating or impregnating fabrics which are required to remain flexible, for example the sheaths of Bowden cables, and other flexible tubular structures, for artificial leather, and for waterproofing fabrics and for a large number of other purposes.

Examples of the organic derivatives of cellulose which may be employed in conjunction with the high proportion of plasticiser are cellulose acetate, cellulose formate, cellulose propionate or other organic ester of cellulose or ethyl cellulose, methyl cellulose or benzyl cellulose or other cellulose ether. The organic derivative of cellulose and plasticiser may be dissolved separately in a volatile solvent and the two solutions mixed, or they may be dissolved in the same solvent. Examples of volatile solvents which may be employed are acetone, alcohol, benzene, methyl ethyl ketone, ethylene dichloride or mixtures of these, while the methyl ether of ethylene glycol, diacetone alcohol and ethyl lactate are examples of medium and high boiling solvents which may be employed.

Natural or synthetic resins may also be included in the composition to improve the strength, and, especially where the composition is to be used for coating purposes, to improve adhesion. Among synthetic resins suitable for this purpose are those obtainable by the condensation of phenols or mercaptans with aldehydes or ketones, diphenylol propane-formaldehyde resins, furfural-ketone furfural amine, phenol-furfural resins, resins obtainable by the condensation of aldehydic or ketonic substances with aromatic amino or aryl sulphonamide or N-alkyl substituted aryl sulphonamide compounds, resins obtainable by the condensation of urea or thio-urea with aldehydes or aldehydes and phenols, lactic acid resins, sulphurised phenol resins, resins obtainable by the polymerisation of aldehydes or of vinyl compounds, and the resins obtainable by the condensation of phthalic anhydride or other dibasic acid anhydride or acid with polyhydric alcohols such for example as glycerol.

It is not essential that only one plasticiser should be employed, thus for example the plasticiser of high compatibility employed in accordance with this invention may be replaced in part by a plasticiser of lesser compatibility. Thus for example triphenyl phosphate, tricresyl phosphate, diphenylol propane, triacetin and diethyl phthalate may also be used but it is important that the quantities employed of these plasticisers should not be so great as to cause the composition to take on the disadvantages enumerated at the beginning of the specification. Any other desired ingredients may be incorporated, for example where coloured effects are required dyes and/or pigments may be added, or fire retardants, for example the tribrom acetanilides.

The following examples are intended to illustrate the present invention, but it is to be understood they are in no way limitative:—

Example 1

| | Parts |
|---|---|
| Cellulose acetate | 100 |
| Dibutyl tartrate | 150 |
| Triphenyl phosphate | 15 |
| Acetone | 500 |
| Methyl acetone | 500 |

Example 2

| | Parts |
|---|---|
| Cellulose acetate | 100 |
| Dibutyl tartrate | 200 |
| Tricresyl phosphate | 20 |
| Acetone | 500 |
| Alcohol | 250 |
| Benzene | 250 |

Example 3

| | Parts |
|---|---|
| Cellulose acetate | 100 |
| Xylene monomethyl sulphonamide | 150 |
| Diphenylol propane | 50 |
| Acetone | 400 |
| Methyl acetate | 250 |
| Methyl ethyl ketone | 200 |
| Diacetone alcohol | 50 |

Example 4

| | Parts |
|---|---|
| Cellulose propionate | 100 |
| Amyl tartrate | 180 |
| Acetone | 800 |

Example 5

| | Parts |
|---|---|
| Cellulose acetate | 100 |
| Synthetic resin e. g. diphenylol propane formaldehyde resin | 30 |
| Xylene monomethyl sulphonamide | 150 |
| Tricresyl phosphate | 20 |
| Ethylene dichloride | 300 |
| Alcohol | 300 |
| Acetone | 400 |

Example 6

| | Parts |
|---|---|
| Cellulose acetate | 100 |
| Synthetic resin as in Example 5 | 35 |
| Dibutyl tartrate | 200 |
| Tricresyl phosphate | 20 |
| Acetone | 500 |
| Dioxane | 100 |
| Methyl ether of ethylene glycol | 50 |
| Ethyl lactate | 20 |

What I claim and desire to secure by Letters Patent is—:

1. Coating and impregnating compositions comprising an organic derivative of cellulose, more than 150 parts of plasticiser selected from the group consisting of the aromatic sulphonamides and their derivatives per 100 parts of cellulose derivative and a volatile solvent.

2. Coating and impregnating compositions comprising an organic derivative of cellulose, between 170 and 220 parts of plasticiser selected from the group consisting of the aromatic sulphonamides and their derivatives per 100 parts of cellulose derivative and a volatile solvent.

3. Coating and impregnating compositions comprising cellulose acetate, more than 150 parts of plasticiser selected from the group consisting of the aromatic sulphonamides and their derivatives per 100 parts of cellulose acetate and a volatile solvent.

4. Coating and impregnating compositions comprising cellulose acetate, between 170 and 220 parts of plasticiser selected from the group consisting of the aromatic sulphonamides and their derivatives per 100 parts of cellulose acetate and a volatile solvent.

5. Coating and impregnating compositions comprising cellulose acetate, more than 150 parts of xylene monomethyl sulphonamide per 100 parts of cellulose acetate and a volatile solvent.

6. Coating and impregnating compositions comprising cellulose acetate, between 170 and 220 parts of xylene monomethyl sulphonamide per 100 parts of cellulose acetate and a volatile solvent.

7. Coating and impregnating compositions comprising an organic derivative of cellulose and more than 150 parts of plasticiser selected from the group consisting of the aromatic sulphonamides and their derivatives per 100 parts of cellulose derivative and containing in addition a resin and a volatile solvent.

8. Coating and impregnating compositions comprising cellulose acetate and more than 150 parts of plasticiser selected from the group consisting of the aromatic sulphonamides and their derivatives per 100 parts of cellulose acetate and containing in addition a resin and a volatile solvent.

WILLIAM HENRY MOSS.